United States Patent Office 2,789,139
Patented Apr. 16, 1957

2,789,139

RECOVERY OF ALLETHROLONE

Harry Greenberg, Baltimore, Md., assignor, by mesne assignments, to Food Machinery and Chemical Corporation, New York, N. Y., a corporation of Delaware No Drawing. Application May 13, 1953,
Serial No. 354,863

7 Claims. (Cl. 260—586)

This invention relates to the production of 2-allyl-4-hydroxy-3-methyl-2-cyclopenten-1-one, commonly known as allethrolone, a compound particularly valuable as an intermediate in the preparation of allethrin, a well-known insecticide.

It has previously been proposed to synthesize allethrolone by a process involving the following steps: (1) reacting sodium acetoacetate with allyl chloride to produce allyl acetone, (2) reacting the allyl acetone with diethyl carbonate to form ethyl-3-oxo-6-heptenoate, (3) reacting the ethyl-3-oxo-6-heptenoate with pyruvaldehyde to form 3-hydroxy-8-nonene-2,5-dione, and (4) cyclizing the resultant dione by treatment with a dilute alkali. The reaction mixture is then saturated with a solution of sodium chloride and extracted with a volatile organic solvent such, for instance, as toluene, benzene, or xylene.

By the procedure just described, the allethrolone is contained in the solvent extract and the solvent is usually separated therefrom by distillation, preferably under reduced pressure, leaving the crude allethrolone as a dark colored, often black, rather viscous liquid which contains, in addition to the allethrolone, considerable quantities of impurities including substantial proportions of impurities of a high boiling, readily decomposable, tar-like nature. Analysis of this crude allethrolone residue has shown an average allethrolone content of about 45%, by weight.

It has been proposed to separate the allethrolone from the crude residue by fractional distillation with refluxing. It has been found, however, that fractional distillation of this crude residue, even when conducted in most efficient fractionating columns, does not result in allethrolone of the desired purity.

Also, attempts to extract the allethrolone from the crude residue, either with single or mixed organic solvents, or with water, have resulted in the separation of the allethrolone in a state unsuited to the production of allethrin because of the relatively large amounts of impurities present.

I have discovered that allethrolone of remarkably increased purity may readily be separated from the crude allethrolone residue by combined fractional distillation and water extraction steps, provided the crude allethrolone is first subjected to a simple rapid distillation to remove the major portion of the high-boiling, readily decomposable tars normally present.

Where the crude allethrolone residue is subjected to fractional distillation before removing such high boiling tars, the latter materials appear to decompose during the relatively prolonged heating period, characteristic of fractional distillation, to form volatile materials which interfere with the separation of concentrated allethrolone.

Where the crude allethrolone residue is directly subjected to solvent extraction by means of organic solvents, relatively large proportions of the tarry impurities are also dissolved by the solvent. Similarly, it appears that these tarry impurities are soluble in aqueous solutions of allethrolone and therefore aqueous extraction has failed to give adequate separation.

Predicated upon my discovery, the present invention, in its broader aspect, comprises the step of subjecting the synthesized crude allethrolone to a preliminary simple, rapid distillation, with no refluxing, to separate the lower-boiling fraction containing the allethrolone from the higher-boiling, decomposable tarry fraction. Advantageously, this simple distillation is of the flash distillation type so as to minimize the heating period. Such distilation may, with advantage, be effected by continuously feeding the crude allethrolone to a heated vessel maintained at subatmospheric pressure and at a temperature adequate to vaporize the allethrolone fraction at the prevailing pressure and continuously and separately withdrawing the vapors and unvaporized residue from the vessel. Advantageously, the vessel is maintained at a subatmospheric pressure of the order of about 0.2 to 5 mm. of mercury and at a temperature within the range of 50° to 125° C.

An alternative method of effecting this simple distillation is to heat the crude allethrolone, as by passing it through a heating tube, and discharge the heated mixture into a vessel maintained at subatmospheric pressure so that the allethrolone fraction is flashed into vapor upon entering the vessel, the vapors and unvaporized residue being separately withdrawn from the vaporizing chamber.

Though it is advantageous to minimize decomposition of the tarry constituents of the crude allethrolone in this preliminary step, some decomposition is permissible. However, where such decomposition is encountered, it is advantageous to separate the lower boiling constituents from the allethrolone fraction in the condensing step by suitable adjustment of condensing temperatures.

Where this preliminary simple distillation step is employed, it is not necessary that the organic solvent, used in extracting the allethrolone from the synthetic mixture, be completely separated from the crude allethrolone residue, as the separation of residual organic solvent may be readily affected by the simple distillation step just described. Indeed, the organic solvent extract from the synthesis may be directly subject to the preliminary distillation step of my present invention.

Having separated the allethrolone fraction of the synthesized crude allethrolone from the readily decomposable tarry impurities, the allethrolone can be readily separated in a surprisingly concentrated form from said fraction by coordinated fractional distillation and water extraction steps.

In accordance with a preferred modification of my process, the allethrolone fraction from the preliminary distillation step is subjected to a fractional distillation at a subatmospheric pressure of about 0.2 to 0.5 mm. of mercury and the fraction boiling over within the temperature range of about 80° C. to about 95° C. separately collected. By this procedure, I have usually found that the resulting allethrolone fraction contains about 75% of allethrolone by weight, an upgrading of about 30%.

The pressure at which this fractional distillation is effected will, of course, influence the boiling range of the desired allethrolone fraction. However, I have usually found that most of the allethrolone is contained in a fraction boiling within a range of about 15° C.

The fraction separately collected from the fractional distillation step is then agitated with several times its volume of water, preferably about 4 or 5 times its volume, and the aqueous layer separated from the insoluble oil. Advantageously, the insoluble oil is subjected to repeated extractions with water, usually about three separate extractions, and the aqueous layers from the several extractions combined. The water is then separated from the dissolved allethrolone in any suitable manner.

I have found it generally advantageous to filter the water extracts to remove any oil globules which may be present. I have also found it advantageous to treat the aqueous extracts with a small amount of decolorizing carbon prior to filtration in order to remove some of the coloring matter generally present.

The removal of water from the aqueous allethrolone extract may be effected by evaporation, preferably at about 60° C., or by such evaporation aided by aeration to promote the removal of the last of the water. An alternative is to saturate the aqueous extract with sodium chloride and extract the resultant oil layer with ether, to obtain an ether extract of the allethrolone, and subsequently dehydrating the ether extract by the addition of an anhydrous drying agent, such as sodium sulfate, and then removing the ether therefrom my evaporation. As a further alternative, the allethrolone may be separated from the aqueous extract by azeotropic distillation using benzene, or similar compounds.

By the foregoing procedures, I have obtained allethrolone of 90% purity or better, by weight.

Some of the impurities present in the allethrolone fraction obtained from the fractional distillation step appear to be soluble in water, or to become so in the presence of allethrolone. Where the aqueous extraction of this fraction is carried to extremes, a less pure allethrolone is apt to result. By a less thorough aqueous extraction, one may obtain allethrolone of a higher purity, though in somewhat decreased amounts. For instance, by the procedure just described, using a single aqueous extraction with 4 to 5 volumes of water, I have obtained products containing 93% to 94% allethrolone. Usually two aqueous extractions using 4 to 5 volumes of water for each extraction will remove approximately 80% of the total allethrolone present in the allethrolone fraction from the fractional distillation just described.

The invention will be further illustrated by the following specific examples:

*Example I*

A sample of crude allethrolone, resulting from the synthesis previously described herein, and from which the organic solvent had been removed, was subjected to a preliminary rapid, simple distillation by continuously charging it to a distilling flask maintained at an absolute pressure of about 0.2 mm. of mercury and at a temperature approaching, but not exceeding, about 125° C. The resulting vapors were rapidly withdrawn from the flask, without refluxing, and condensed and the resultant distillate subjected to fractional distillation at a subatmospheric pressure of 0.2 to 0.5 mm. of mercury. The fraction coming off at a head temperature of 86° to 95° C. was separately collected, and was found by analysis to contain 69.1% allethrolone, by weight.

304 grams of this fraction was agitated 1,000 cc. of water at room temperature and the water layer separated from the oil layer. The water layer was then saturated with sodium chloride and extracted three times, each with 100 cc. of ethyl ether. The combined ether extracts were dried over anhydrous sodium sulfate, and filtered through a few grams of decolorizing carbon. The ether was then removed by evaporation, under reduced pressure, and a maximum temperature of about 60° C. The residue thus obtained weighed 104.5 grams and was found, by analysis, to contain 93.3% allethrolone.

The oil layer remaining after the first water extraction was again extracted with 1,000 cc. of water and the allethrolone separated therefrom with ether extraction, as just described. There was thus obtained an additional 75 grams of allethrolone of 85.9% purity.

The oil layer from the second water extraction was similarly extracted with water and then with ether, and there was thus obtained an additional 31.5 grams of allethrolone of 84.1% purity.

*Example II*

200 grams of crude allethrolone resulting from a preliminary rapid, simple distillation, followed by a fractional distillation, substantially as described in Example I, and found to contain 70.6% allethrolone, was extracted with 1,000 cc. of water at room temperature for about one-half hour, and the aqueous layer and oil layer separated. The oil layer was found to weigh 119 grams and was similarly extracted with 600 cc. of water, the remaining oil layer weighing 85 grams.

The aqueous extracts thus obtained were combined, filtered through a few grams of decolorizing carbon, saturated with sodium chloride and extracted three times, each with 100 cc. ethyl ether. The combined ether extracts were dried with anhydrous sodium sulfate and the ether removed by evaporation, under reduced pressure. There was thus obtained a residue weighing 99 grams which was found, by analysis, to contain 85.3% allethrolone, by weight.

*Example III*

100 pounds of a crude allethrolone distillate, obtained by the preliminary rapid, simple distillation, followed by a fractional distillation, substantially as described in Example I, was agitated with 500 pounds of water for one-half hour, allowed to settle and the two layers separated. There was thus obtained an oil layer weighing 54 pounds which was again extracted with 240 pounds of water, as just described, the remaining oil layer weighing 32 pounds.

The water layers from the two aqueous extractions were combined and 8 pounds of decolorizing carbon was added thereto, the mixture well agitated and then filtered. The filtrate was placed in a steam-heated kettle equipped for vacuum evaporation. The water was removed, under a vacuum of approximately 27 inches of mercury and at an elevated temperature not exceeding 60° C., for the most part between 40° and 50° C. During this evaporation, a small stream of air was passed through the liquid to promote removal of the water.

The total water evaporated amounted to 737 pounds and was found, by analysis, to contain 7 pounds of allethrolone. There remained in the kettle a residue weighing 52.5 pounds and containing 88.8% allethrolone.

As appears from the foregoing examples, the present invention provides a process whereby allethrolone of relatively high purity can be obtained from the crude allethrolone from the synthesis, by coordinated fractional distillation and aqueous extraction steps providing the crude material is, prior thereto, subjected to a rapid, simple distillation, as previously described herein, to separate the allethrolone from the relatively high-boiling, readily decomposable tarry impurities.

In the preceding examples, I have described operations in which the fractional distillation preceded the water extraction step. Beneficial results can be obtained even when the water extraction precedes the fractional distillation. However, in the latter case, it is advantageous to remove from the crude allethrolone all, or substantially all, of the organic solvent used in the synthesis before subjecting the fraction to the aqueous extraction.

By extensive efforts, I have found that the recovery of allethrolone in high concentration, such as obtained by my present invention by coordinated steps of fractional distillation and aqueous extraction, is possible by such steps only after the crude allethrolone resulting from the synthesis has been separated from the high boiling tarry impurities by simple distillation.

The invention has been found especially valuable as applied to the separation of allethrolone from crude allethrolone mixtures resulting from the synthesis particularly described herein. However, in its broader aspect, the invention also contemplates the separation of allethrolone from similar crude allethrolone mixtures con-

I claim:

1. Method of separating allethrolone in a relatively pure state from crude allethrolone mixtures resulting from the synthesis thereof and containing relatively large proportions of high-boiling, readily decomposable tarry impurities, said method comprising the step of subjecting the crude allethrolone mixture to a simple distillation at subatmospheric pressure and at an elevated temperature not exceeding 125° C. to separate the crude allethrolone from the high-boiling, readily decomposable tars and thereafter subjecting the separated crude allethrolone fraction to fractional distillation at subatmospheric pressure and water extraction steps.

2. Method of separating allethrolone in relatively pure state from crude allethrolone resulting from the synthesis of allethrolone by (1) reacting sodium acetoacetate with allyl chloride to produce allyl acetone, (2) reacting the allyl acetone with diethyl carbonate to form ethyl-3-oxo-6-heptenoate, (3) reacting the resultant heptenoate with pyruvaldehyde to form 3-hydroxy-8-nonene-2,5-dione and (4) cyclizing the resultant dione by treating with dilute alkali followed by saturation of the resultant reaction mixture with sodium chloride and extracting with an organic solvent, whereby crude allethrolone is separated in admixture with high-boiling, readily decomposable tarry impurities, said method comprising the step of subjecting the crude allethrolone mixture to a simple distillation at subatmospheric pressure and at an elevated temperature not exceeding about 125° C. to separate the crude allethrolone from the high-boiling, readily decomposable tars and thereafter subjecting the separated crude allethrolone fraction to fractional distillation at subatmospheric pressure and water extraction steps.

3. The method of claim 2 in which the simple distillation is carried out at a subatmospheric pressure within the range of 0.2 to 5 mm. of mercury and at a temperature within the range of 50° to 125° C.

4. Method of separating allethrolone in relatively pure state from crude allethrolone resulting from the synthesis of allethrolone by (1) reacting sodium acetoacetate with allyl chloride to produce allyl acetone, (2) reacting the allyl acetone with diethyl carbonate to form ethyl-3-oxo-6-heptenoate, (3) reacting the resultant heptenoate with pyruvaldehyde to form 3-hydroxy-8-nonene-2,5-dione and (4) cyclizing the resultant dione by treating with dilute alkali followed by saturation of the resultant reaction mixture with sodium chloride and extracting with an organic solvent whereby crude allethrolone is separated in admixture with high-boiling, readily decomposable tarry impurities, said method comprising the steps of subjecting the crude allethrolone mixture to a simple distillation at a subatmospheric pressure within the range of 0.2 to 5 mm. of mercury and a temperature within the range of 50° to 125° C., fractionally distilling the resultant distillate at subatmospheric pressure and separately collecting a fraction containing the major proportion of the allethrolone and boiling within a range of about 15° C., extracting said fraction with water and removing the water from the aqueous extract.

5. The method of claim 4 in which the fractional distillation is carried out at an absolute pressure of 0.2 to 0.5 mm. of mercury and the separately collected fraction is one distilling over at a head temperature within the range of 80° to 95° C.

6. The method of claim 5 in which the separately collected fraction is repeatedly extracted with four to five times its volume of water.

7. The method of claim 5 in which the fractional distillation step follows the aqueous extraction.

References Cited in the file of this patent

UNITED STATES PATENTS

| | | |
|---|---|---|
| 2,574,500 | Schechter et al. | Nov. 13, 1951 |
| 2,603,652 | Schechter et al. | July 15, 1952 |
| 2,661,374 | Schechter et al. | Dec. 1, 1953 |